(12) United States Patent
Edgett et al.

(10) Patent No.: US 7,961,884 B2
(45) Date of Patent: Jun. 14, 2011

(54) METHOD AND SYSTEM FOR CHANGING SECURITY INFORMATION IN A COMPUTER NETWORK

(75) Inventors: Jeff Steven Edgett, Sunnyvale, CA (US); Singam Sunder, San Jose, CA (US)

(73) Assignee: iPass Inc. DE (US)

( * ) Notice: Subject to any disclaimer, the term of this patent is extended or adjusted under 35 U.S.C. 154(b) by 1049 days.

(21) Appl. No.: 10/218,961

(22) Filed: Aug. 13, 2002

(65) Prior Publication Data
US 2004/0034771 A1    Feb. 19, 2004

(51) Int. Cl.
*H04L 9/00*    (2006.01)

(52) U.S. Cl. .......... 380/277; 380/259; 705/71; 713/171; 726/1; 726/2

(58) Field of Classification Search ............... 380/277, 380/278, 279, 259; 726/1, 2; 713/171; 705/71
See application file for complete search history.

(56) References Cited

U.S. PATENT DOCUMENTS

| | | | |
|---|---|---|---|
| 5,202,921 A | 4/1993 | Herzberg et al. | |
| 5,331,574 A | 7/1994 | Temoshenko et al. | |
| 5,402,490 A * | 3/1995 | Mihm, Jr. .................. | 380/247 |
| 5,412,723 A | 5/1995 | Canetti et al. | |
| 5,446,680 A | 8/1995 | Sekiya et al. | |
| 5,497,421 A | 3/1996 | Kaufman et al. | |
| 5,564,017 A | 10/1996 | Corn et al. | |
| 5,606,663 A | 2/1997 | Kadooka | |
| 5,611,048 A | 3/1997 | Jacobs et al. | |
| 5,638,514 A | 6/1997 | Yoshida et al. | |
| 5,726,883 A | 3/1998 | Levine et al. | |
| 5,781,189 A | 7/1998 | Holleran et al. | |
| 5,793,952 A | 8/1998 | Limsico | |
| 5,802,592 A | 9/1998 | Chess et al. | |
| 5,815,665 A | 9/1998 | Teper et al. | |
| 5,832,228 A | 11/1998 | Holden et al. | |
| 5,845,267 A | 12/1998 | Ronen | |
| 5,852,812 A | 12/1998 | Reeder | |
| 5,892,900 A | 4/1999 | Ginter et al. | |
| 5,991,292 A | 11/1999 | Focsaneanu et al. | |
| 6,023,470 A | 2/2000 | Lee et al. | |
| 6,023,502 A | 2/2000 | Bouanaka et al. | |
| 6,026,375 A | 2/2000 | Hall et al. | |
| 6,028,917 A | 2/2000 | Creamer et al. | |
| 6,029,143 A | 2/2000 | Mosher et al. | |

(Continued)

FOREIGN PATENT DOCUMENTS

EP    1011223    6/2000

(Continued)

OTHER PUBLICATIONS

"Broadmedia Introduces G-Phone DLX Phone (Product Announcement)", *Tele-Service News*, 12(6), (Jun. 1, 2000), 2 pgs.

(Continued)

*Primary Examiner* — Christian LaForgia
*Assistant Examiner* — Roderick Tolentino
(74) *Attorney, Agent, or Firm* — DeLizio Gilliam, PLLC

(57) ABSTRACT

A method of, and system for, changing encryption information in a computer network is provided. The method includes providing at least first cryptographic information and second cryptographic information. A first validity period is provided for the first cryptographic information and a second validity period is provided for the second cryptographic information wherein the first and second validity periods overlap.

33 Claims, 7 Drawing Sheets

U.S. PATENT DOCUMENTS

| | | | |
|---|---|---|---|
| 6,032,132 A | 2/2000 | Nelson | |
| 6,032,137 A | 2/2000 | Ballard | 705/75 |
| 6,035,281 A | 3/2000 | Crosskey et al. | |
| 6,047,051 A | 4/2000 | Ginzboorg et al. | |
| 6,049,671 A | 4/2000 | Slivka et al. | |
| 6,055,503 A | 4/2000 | Horstmann | |
| 6,078,906 A | 6/2000 | Huberman | 705/37 |
| 6,094,721 A | 7/2000 | Eldridge et al. | |
| 6,112,239 A | 8/2000 | Kenner | |
| 6,125,354 A | 9/2000 | MacFarlane et al. | |
| 6,128,601 A | 10/2000 | Van Horne et al. | |
| 6,157,618 A | 12/2000 | Boss et al. | 370/252 |
| 6,157,723 A * | 12/2000 | Schultz | 380/273 |
| 6,167,126 A | 12/2000 | Janning | |
| 6,175,869 B1 | 1/2001 | Ahuja et al. | 709/226 |
| 6,188,994 B1 | 2/2001 | Egendorf | |
| 6,189,096 B1 | 2/2001 | Haverty | |
| 6,198,824 B1 | 3/2001 | Shambroom | |
| 6,208,977 B1 | 3/2001 | Hernandez et al. | |
| 6,212,280 B1 * | 4/2001 | Howard et al. | 380/279 |
| 6,212,561 B1 | 4/2001 | Sitaraman et al. | |
| 6,216,117 B1 | 4/2001 | Hall | |
| 6,219,790 B1 | 4/2001 | Lloyd et al. | |
| 6,240,091 B1 | 5/2001 | Ginzboorg et al. | |
| 6,260,142 B1 | 7/2001 | Thakkar et al. | |
| 6,269,401 B1 | 7/2001 | Fletcher et al. | |
| 6,317,792 B1 | 11/2001 | Mundy et al. | |
| 6,324,579 B1 | 11/2001 | Bleuse et al. | |
| 6,327,707 B1 | 12/2001 | McKeeth et al. | |
| 6,330,443 B1 | 12/2001 | Kirby | 455/432 |
| 6,367,013 B1 * | 4/2002 | Bisbee et al. | 713/178 |
| 6,405,028 B1 | 6/2002 | DePaola et al. | 455/406 |
| 6,438,550 B1 * | 8/2002 | Doyle et al. | 707/9 |
| 6,463,534 B1 | 10/2002 | Geiger et al. | |
| 6,510,463 B1 | 1/2003 | Farhat et al. | |
| 6,513,060 B1 | 1/2003 | Nixon et al. | |
| 6,522,884 B2 | 2/2003 | Tennison et al. | 455/445 |
| 6,546,492 B1 | 4/2003 | Walker et al. | |
| 6,549,770 B1 | 4/2003 | Marran | 455/414 |
| 6,577,858 B1 | 6/2003 | Gell | 455/407 |
| 6,578,075 B1 | 6/2003 | Nieminen et al. | 709/221 |
| 6,628,775 B1 | 9/2003 | Van Tol | 379/221 |
| 6,640,242 B1 | 10/2003 | O'Neal et al. | 709/206 |
| 6,687,560 B2 | 2/2004 | Kiser et al. | 700/108 |
| 6,748,439 B1 | 6/2004 | Monachello et al. | |
| 6,753,887 B2 | 6/2004 | Carolan et al. | |
| 6,792,464 B2 | 9/2004 | Hendrick | |
| 7,275,155 B1 * | 9/2007 | Aull | 713/157 |
| 2002/0023213 A1 * | 2/2002 | Walker et al. | 713/168 |
| 2002/0029275 A1 | 3/2002 | Selgas et al. | 709/227 |
| 2002/0114346 A1 | 8/2002 | Lampe et al. | 370/465 |
| 2002/0152375 A1 * | 10/2002 | Shigematsu et al. | 713/155 |
| 2006/0129818 A1 * | 6/2006 | Kim et al. | 713/171 |

FOREIGN PATENT DOCUMENTS

| | | |
|---|---|---|
| GB | 2357407 | 6/2001 |
| JP | 02033648 A | 2/1990 |
| JP | 02039260 A | 2/1990 |
| JP | 02112053 A | 4/1990 |
| JP | 03189852 A | 8/1991 |
| JP | 04054661 A | 2/1992 |
| JP | 04067252 A | 3/1992 |
| JP | 04084254 A | 3/1992 |
| JP | 04142655 A | 5/1992 |
| JP | 05189288 A | 7/1993 |
| JP | 05199327 | 8/1993 |
| JP | 07182064 A | 7/1995 |
| JP | 09265455 A | 10/1997 |
| JP | 09330298 A | 12/1997 |
| JP | 10289209 A | 10/1998 |
| JP | 11203247 A | 7/1999 |
| JP | 11340966 | 12/1999 |
| JP | 00112892 A | 4/2000 |
| JP | 00165839 A | 6/2000 |
| JP | 00194657 A | 7/2000 |
| JP | 00259276 A | 9/2000 |
| JP | 01053910 A | 2/2001 |
| WO | WO-97/15885 | 5/1997 |
| WO | WO 97/15885 A1 | 5/1997 |
| WO | WO 00019297 A1 | 4/2000 |
| WO | WO 00062514 A2 | 10/2000 |

OTHER PUBLICATIONS

"Dial Up With Bay's New Remote Access Concentrator", *IT Times*, (Oct. 21, 1997), p. 6.

"IP Axess Adds Fixed-Wireless Service Provider to Participants in its Expanding Evaluation Program", *Business Wire*, (Apr. 4, 2001), 2 pgs.

"Lucent Technologies Launches Next-Generation Voice Dialing Service for Wireless Networks. (Brief Article).", *Cambridge Telecom Report*, (Mar. 27, 2000), 2 pgs.

"Netopia Introduces First ADSL Routers to Offer Integrated Backup Module for "Fast Tract" Deployment and Fully Redundant Internet Connectivity", *Business Wire*, (May 24, 2000), 5 pgs.

"Triangy's New Insight for Dial Access Solution Suite Delivers Proactive Management of Dial-Up Service Offerings", *Business Wire*, (Apr. 24, 2001), 2 pgs.

"Ubrandit.com Adds Gigitel and Zodiac Cafe to Virtual ISP Client List", *Business Wire*, (Oct. 16, 2000), 2 pgs.

Edwards, Morris, "It's a VPN thing—Technology Information", *Communications News*, (Aug. 1, 1999), 4 pgs.

Schneier, Bruce, *Applied Cryptography: protocols, algorithms, and source code in C*, New York : Wiley, 2nd Edition,(1996),31-34, 52-56, 60, 75-79, 256, 480-481.

West, Wray, "Don't be nervous—remote access VPN's—Industry Trend or Event", *Communication News*, 37(5), (May 2000), 28, 30, 32.

Barron, Gilberto , "Written Opinion", PCT/US02/12343.

Blache, Fabian III , "Spicing up the Web", *Greater Baton Rouge Business Report*, ISSN-0747-4652,(Jul. 18, 2000),v18n23 pp. 94.

Blass, Steve , "Dr. Internet", *Network World*, ISSN-0887-7661,(Mar. 11, 2002),55.

Brockmann, Peter , "Rapport dialup switch redefines Internet service opportunities", *Telesis*, ISSN-0040-2710,(96/12/00),n102 pp. 12-13.

Edwards, Morris , "It's a VPN thing. (Technology Information)", *Communications News*, ISSN-0010-3632(Aug. 1, 1999), vol. 36, No. 8, pp. 94.

Greene, Tim , "Upstart VPN services staking out new ground", *Network World*, ISSN-0887-7661,(Apr. 16, 2001),v18n16 pp. 30.

Guy, Sandra , "Untangling phone frustration, Bellcore solution offers a simpler way to do business", *Telephony*, ISSN-0040-2656,(Jun. 2, 1997).

Harrell, Robert B., "International Search Report", PCT/US01/41540.

Johnson, Johna T., "Linking corporate users to the Internet", *Data Communications*, ISSN-0363-6399,(93/01/00),v22n1 pp. 56-58.

Likier, Marty , "Using Dial-Up Technology for Internetworking Applications", *Telecommunications*, ISSN-0278-4831,(92/05/00),v26n5 pp. 52,54.

Malinowski, Walter , "International Search Report", PCT/US01/05752.

Millin, Vincent , "International Search Report", PCT/US01/05724.

No-Author, "Broadmedia Introduces G-Phone DLX IP Phone. (Product Announcement)", *Tele-Service News*, (Jun. 1, 2000), vol. 12, No. 6, pp. NA.

No-Author, "Companies mix and match VPN, dial-access support", *InternetWeek*, ISSN-0746-8121,(Jan. 25, 1999),n749 pVPN20.

No-Author, "Dial Up with Bay's new Remote Access Concentrator", *IT Times*, (Oct. 21, 1997), p. 6.

No-Author, "EarthLink Dials Up ClientLogic for Multi-Channel Technical Support", *Business Wire*, (Jul. 24, 2001),2226.

No-Author, "IP Axess Adds Fixed-Wireless Service Provider to Participants in Its Expanding Evaluation Program", *Business Wire*, (Apr. 4, 2001),2225.

No-Author, "Lucent Technologies Launches Next-Generation Voice Dialing Service for Wireless Networks.(Brief Article)", *Cambridge Telecom Report*,(Mar. 27, 2000),NA.

No-Author, "Netopia Introduces First ADSL Routers to Offer Integrated Backup Module for "Fast Track" Deployment and Fully Redundant Internet Connectivity", *Business Wire*, (May 24, 2000),0514.

No-Author, "Trinagy's New Insight for Dial Access Solution Suite Delivers Proactive Management of Dial-Up Service Offerings", *Business Wire*, (Apr. 24, 2001),2448.

No-Author, "Ubrandit.com Adds Gigitel and Zodiac Cafe to Virtual ISP Client List", *Business Wire*, (Oct. 16, 2000),0709.

Salamone, Salvatore , "Simpified Roaming, From POP To POP", *InternetWeek*, ISSN-1096-9969,(Feb. 15, 1999),n752 pp. 11.

Sanders, Bob , "Despite nasty shake-out local ISPs are thriving", *New Hampshire Business Review*, ISSN-0164-8152,(Feb. 23, 2001),v23n4 pp. 1.

Scarcia, Costantino , "Getting On the New With The Right ISP", *New Jersey Business*, ISSN-0028-5560,(Sep. 1, 2000),v46n9 pp. 40.

Semich, J. W., "56K server supports U.S. Robotics and Lucent—Modems built into Model 8000 from Bay Networks", ISSN-1081-3071, ISSN-1081-3071,(Aug. 18, 1997),v3 n26 p. 25.

Shen, Jin , et al., "Research and implementation of proxy server", *Journal of Nanjing University of Aeronautics & Astronautics*, ISSN-1005-2615,(Dec. 2000), vol. 32 No. 6 pp. 620-624.

Silberg, Luire , "Dialing the Web AT&T's Internet Cellphone Debuts at Mass; Launches PocketNet wireless data service at retail in an attempt to bring cellphone with Internet access to the masses", *HFN the Weekly Newspaper for the Home Furnishing Network*, (Oct. 13, 1997),93.

Trammell, James , "International Search Report", PCT/US01/05723.

West, W. , "Don't be nervous Y remote access VPNs", *Communications News*, ISSN-0010-3632,(May 2000),vol. 37, No. 5 pp. 28, 30, 32.

International Search Report-PCT/US02/25996-Dec. 12, 2002.

Aboba, B. et al., Network Access Identifier, RFC2486, Jan. 1999, pp. 1-5.

Schneier, B., Applied Cryptography Second Edition. Oct. 1995, John Wiley and Sons, pp. 31-34, 52-56, 60, 75-79, 256, 480-481.

International Search Report-PCT/US02/12343-Sep. 19, 2002.

International Search Report-PCT/US02/12470-Sep. 16, 2002.

International Search Report-PCT/US02/12475-Sep. 11, 2002.

Bruno, Lee, "Software & security. (Netegrity's Siteminder Enterprise Security software) (Product Information)", Data Communications, NeTegrity Inc., Jan. 1997, 84(3) page(s), ISSN-0363-6399.

Clyde, Robert A. "Try a step-by-step approach. (data security measures)", Computing Canada, Jan. 4, 1995, vol. 21, No. 1, 42(1) page(s), ISSN-0319-0161.

Barron, Gilberto, "PCT Written Opinion".

Kang, Paul H., "PCT Search Report".

"EP1011223 English Translation", http://v3.espacenet.com/publicationDetails/biblio?CC=EP&NR=1011223A1&KC=A1&FT=D&date=20000621&DB=EPODOC&locale=en_EP (Obtained from the Internet on Feb. 8, 2010) Jun. 21, 2000 , 10 pages.

"PCT Application No. EP2002757134 International Search Report", Jul. 16, 2009 , 4 pages.

\* cited by examiner

EXAMPLES OF SECURITY INFORMATION:

- PASSWORD

- ENCRYPTION ALGORITHM

- ENCRYPTION KEYS

METHOD AND SYSTEM FOR CHANGING SECURITY INFORMATION IN A COMPUTER NETWORK

The present application claims the benefit of the filing date of U.S. patent application Ser. No. 10/118,380 entitled "METHOD AND SYSTEM FOR ASSOCIATING A PLURALITY OF TRANSACTION DATA RECORDS GENERATED IN A SERVICE ACCESS SYSTEM" filed Apr. 5, 2002.

FIELD OF THE INVENTION

The present invention relates generally to changing security information in a computer network. The invention extends to a method of, and system for, changing encryption information and passwords in a service access system.

BACKGROUND

In order to secure communication between a remote computer device and a computer network, security measures are typically incorporated to ensure a confidential and secure communication link. Typical examples of such security measures are passwords, encryption algorithms, and encryption keys.

A simple way to control access to a network, a source of information, a communication channel, or the like is by means of a password. Passwords are, for example, extensively used in an Internet environment where a valid password must be entered prior to a user gaining access to website or the like. In order further to enhance security, encryption techniques are often employed wherein data, e.g. password and other authentication data, is encrypted using an encryption algorithm and encryption keys.

When a breach in security occurs, e.g., a password has been compromised, an encryption key has been compromised, and/or an encryption algorithm has been compromised, existing security information is typically invalidated and new security information is introduced. For example, a new password may replace the compromised password so that access may only be obtained using the new password, a new encryption algorithm may replace an existing algorithm, and/or a new encryption key may replace an existing key.

When the abovementioned security information is used by a large number of people, updating security information may be problematic. Supplying users with updated security information has become more challenging due to the increasing globalization of economies. As a result, there is an increasing dependence of corporations and persons on Internet-based communications. Furthermore, mobile workers (so-called "road warriors") typically access Internet-based and wireless communications as they travel worldwide. Services that facilitate communications to such mobile persons are commonly referred to as "roaming services". It will be appreciated that secure communication in these environments is particularly favorable and that any breach in security should be addressed as soon as possible.

For the purposes of this specification, the term "connection application" should be construed broadly as including, but not limited to, any device (both hardware and software) including functionality to authenticate data e.g., a peer-to-peer authentication arrangement, a dialer, a smart client, a browser, a supplicant, a smart card, a token card, a PDA connection application, a wireless connection, an embedded authentication client, an Ethernet connection, or the like.

SUMMARY OF THE INVENTION

In accordance with an aspect of the present invention, there is provided a method of changing encryption information in a computer network, the method including:

providing at least first cryptographic information and second cryptographic information; and defining a first validity period for the first cryptographic information and a second validity period for the second cryptographic information wherein the first and second validity periods overlap.

Still further in accordance with the invention, there is provided a method of processing encrypted data in a computer network, the method including:

receiving the encrypted data from a user device, the encryption data being encrypted using one of first and second encryption information, the first encryption information being valid for a first validity period and the second information being valid for a second validity period;

identifying which one of the first and second encryption information has been used to encrypt the encrypted data thereby to identify associated decryption information; and decrypting the encrypted data with the associated decryption information if the encryption information is within an associated validity period.

According to a further aspect of the invention, there is provided a method of changing security information in a computer network, the method including:

providing at least first security information and second security information; and defining a first validity period for the first security information and a second validity period for the second security information wherein the first and second validity periods overlap.

According to a yet still further aspect of the invention, there is provided a method of processing data in a computer network, the method including:

receiving data from a user device, the data being secured using one of first and second security information;

identifying which one of the first and second security information secures the data;

determining if the identified security information that secures the data is within a validity period associated with the security information; and processing the data with the identified security information when it is within its associated validity period.

According to a further aspect of the invention, there is provided a computer system which includes a server to:

provide at least first cryptographic information and second cryptographic information; and define a first validity period for the first cryptographic information and a second validity period for the second cryptographic information wherein the first and second validity periods overlap.

According to a yet further aspect of the invention, there is provided computer system which includes a server to:

receive encrypted data from a user device, the encrypted data being encrypted using one of first and second encryption information, the first encryption information being valid for a first validity period and the second information being valid for a second validity period;

identify which one of the first and second encryption information has been used to encrypt the encrypted data thereby to identify associated decryption information; and decrypt the encrypted data with the associated decryption information if the encryption information is within an associated validity period.

The invention extends to a machine-readable medium embodying any of the abovementioned methods.

Other features and advantages of the present invention will be apparent from the drawings and detailed description that follow.

BRIEF DESCRIPTION OF THE DRAWINGS

The present invention is illustrated by way of example, and not intended to be limited by the figures of the accompanying drawings, in which like references indicate the same or similar elements and in which.

DETAILED DESCRIPTION

A method and system for changing security information in a computer network are described. In one embodiment, the distribution, management and migration of security information may be accomplished by providing security information such as passwords, encryption algorithms, and encryption keys that have an overlapping time period during which they are valid. For example, the method may be used to update an encryption algorithm and/or encryption key on a connect dialer of a network access device such as a personal computer.

BACKGROUND

Network access devices typically encrypt a network user credential, such as a password, input by a network user to authorize access to a network by the user. In order to enhance security, the network access device may encrypt the network user credential with a public key, which is part of a public/private key pair, prior to transmitting the encrypted network password to a network decryption server. The network decryption server then decrypts the network user credential using the private key of the public/private key pair, where after the decrypted password is sent to an authentication (AAA) server for verification. If the password is positively verified at the AAA server, the AAA server sends an appropriate acknowledgment signal to the network access device indicating that the password has been properly verified or authenticated. Based on the acknowledgement signal, the network access device gains access to the Internet or some other resource.

However, circumstances may arise in which the security information may be compromised. For example, the encrypted password may be captured by a sniffing or snooping application, the encrypted algorithm may become known, keys associated with the encryption algorithm may become known and so on. Other circumstances may also arise in which no security breach has occurred but the encryption algorithm requires updating, for example, an improved encryption algorithm is available for use in the network. It will be appreciated that, as the number of users requiring updated security information increases, the management, distribution and migration to the updated security information becomes a more burdensome task.

Exemplary Network Environment

Figure 1:
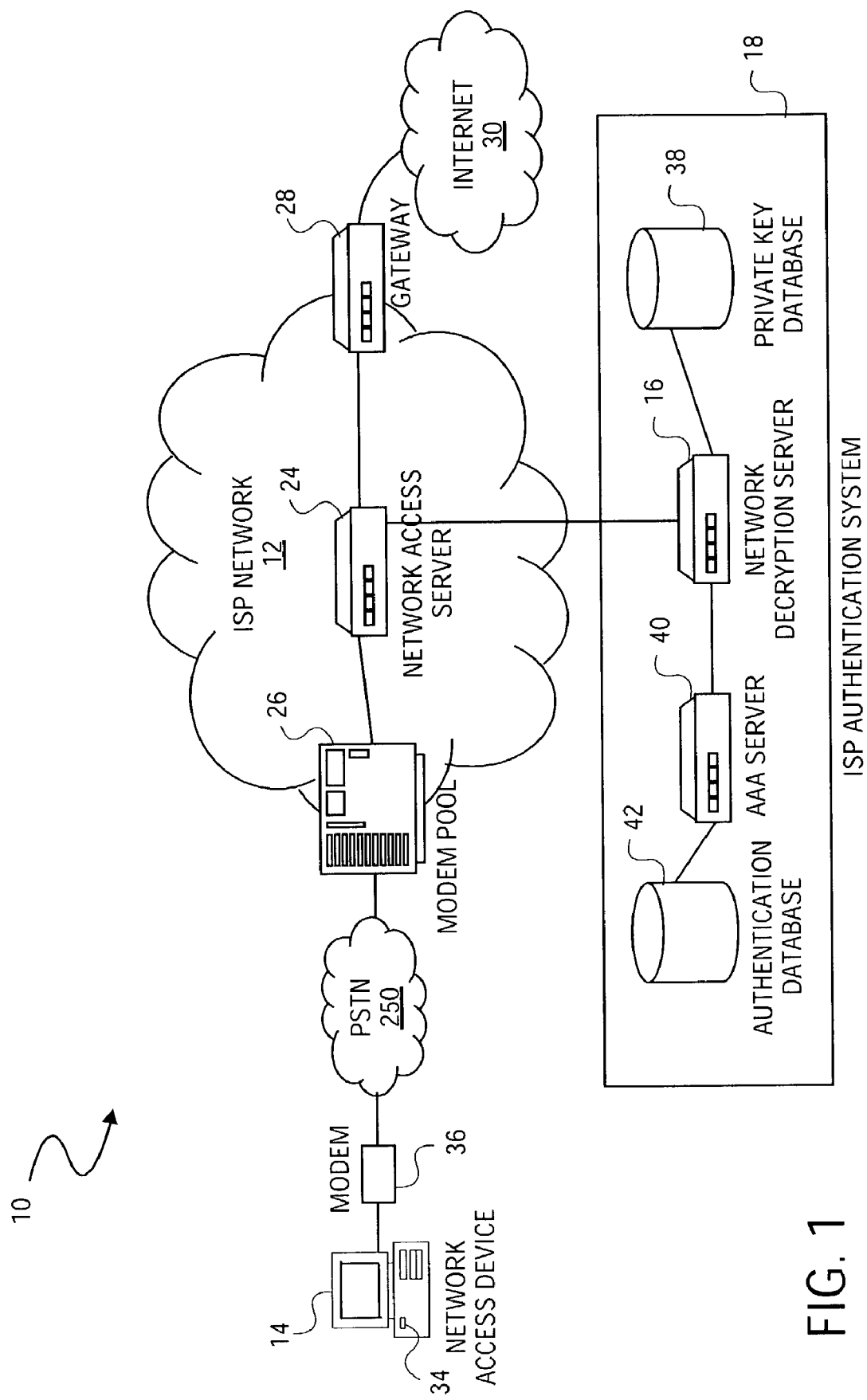
FIG. 1 shows a block diagram of an exemplary network including an ISP network, a network access device, and a network decryption server, in accordance with an embodiment of the invention.
Figure 2:
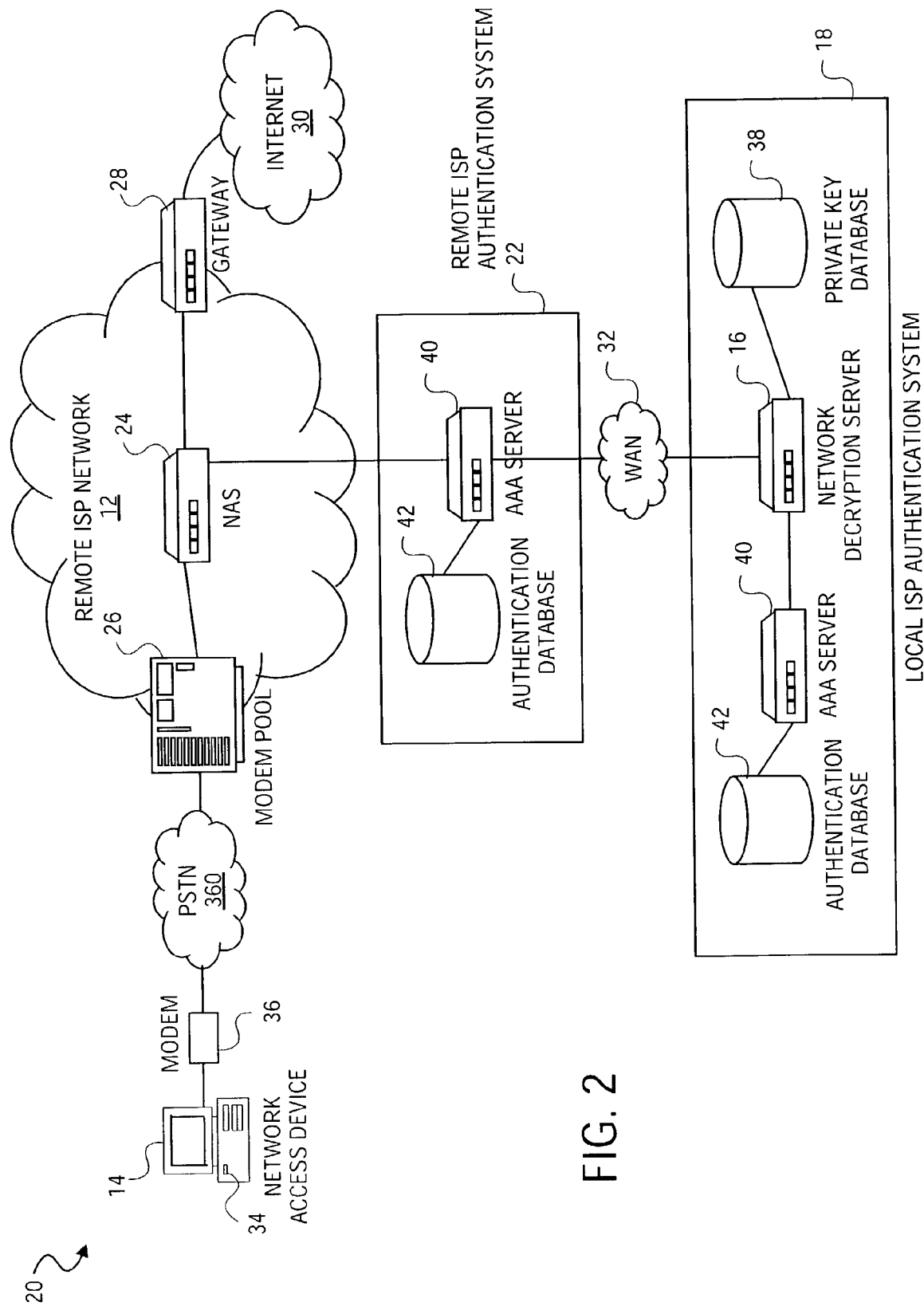
FIG. 2 shows a block diagram of a further exemplary network including a remote ISP network, a network access device and a network decryption server, in accordance with an embodiment of the invention.

Referring to FIG. 1 the drawings, reference numeral 10 generally indicates an exemplary computer network in accordance with an aspect of the invention. The network 10 includes an ISP network 12, a plurality of network access devices 14 (only one of which is shown in the drawings) and an exemplary network decryption server 16, also in accordance with an aspect of the invention, forming part of an ISP authentication system 18. In the network 10, the ISP network 12 communicates directly with the ISP authentication system 18, however, this configuration is merely by way of example and the network may take on different configurations without departing from the invention. For example, as shown in FIG. 2, in a network 20 the ISP network 12 may be a remote ISP network that communicates via a remote ISP authentication system 22 with the ISP authentication system 18, which is also remotely located.

The ISP network 12 includes a Network Access Server (NAS) 24, a modem pool 26 and a gateway 28 connected to the Internet 30. In the embodiment depicted in FIG. 1, the ISP network 12 and the ISP authentication system 18 are physically located within the same facility. However, in the network 20, as shown in FIG. 2, the ISP authentication system 18 may be located in a different facility and connected via a wide area network (WAN) 32 to one or more ISP networks 12 (only one of which is shown in the drawings). The network 20 allows for the individual ISP networks 12 to be strategically located in different geographical areas thereby allowing customers to access the network via a local telephone call, while centralizing the authentication system for added security.

Exemplary Authentication Process

In order to use the network 10, 20, for example in order to access the Internet 30, a network user may execute a dial-up connection application or dialer 34 on the network access device 14. It will be appreciated that the dialer 34 is provided merely by way of example and that any other type of network connection application may be utilized to access the network 10, 20. The dialer 34 may prompt the network user to input a network username and a network password and establish a communication session between a modem 36 and the modem pool 26. Although the exemplary modem 36 is shown in FIGS. 1 and 2 as an external device, in alternative embodiments of the invention, the modem 36 may be an internal device integrated with the network access device 14.

Figure 3:
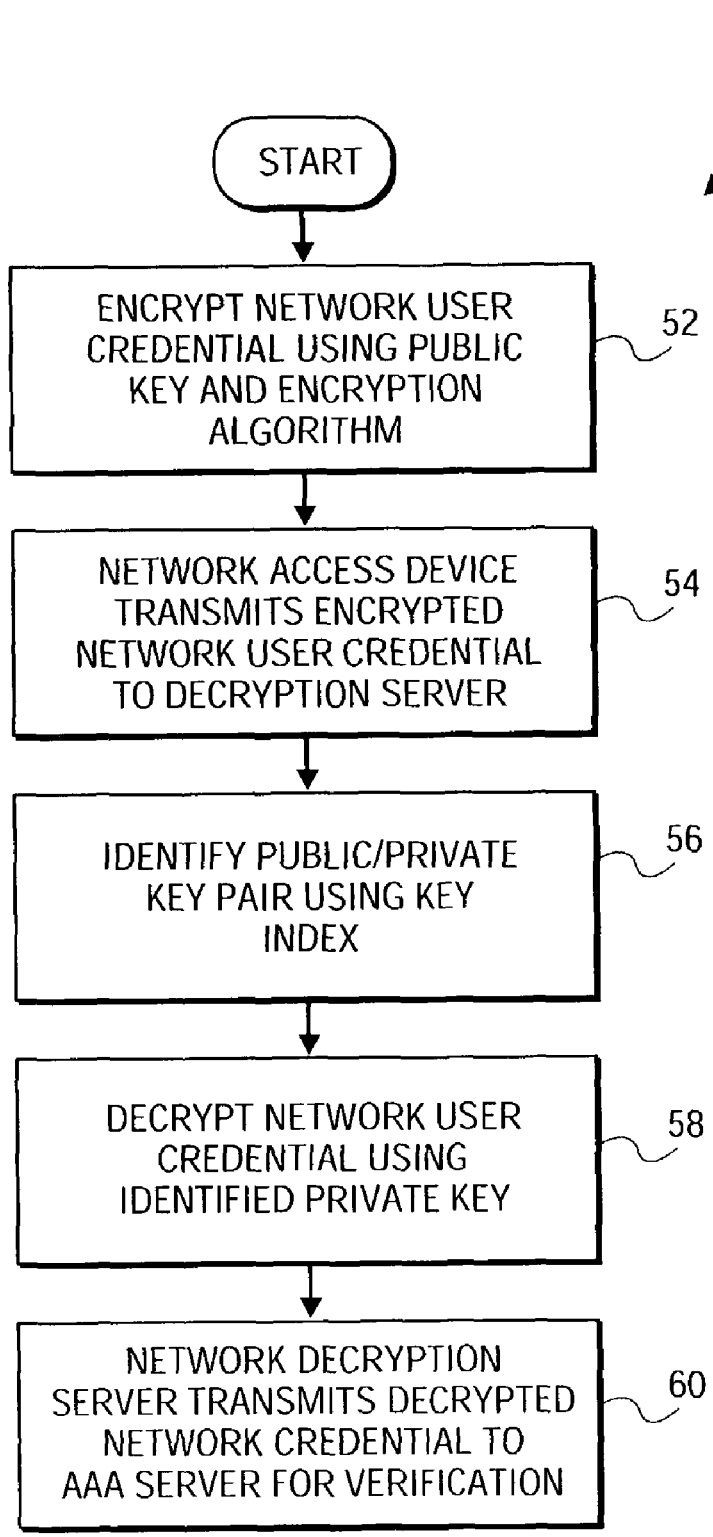
FIG. 3 is a flow diagram of an exemplary method to securely authenticate and update security information in the network.

Referring in particular to FIG. 3 of the drawings, reference numeral 50 generally indicates a method, in accordance with an aspect of the invention for changing security information in the network 10, 20. In the method 50, before the network access device 14 sends the network credentials entered by the network user, the network password is encrypted at block 52. In this embodiment, the password is encrypted using a public key of a public/private key pair. This encryption technique is well known in the art and is generally referred to as asymmetric public key cryptography. In asymmetric public key cryptography, a person makes one key publicly available and holds a second, private key. A message is "locked", or encrypted, with the public key, sent, and then "unlocked", or decrypted, with the private key. In the embodiment of the invention depicted in the drawings, a strong encryption algorithm is used to generate the public/private key pair.

The public key may be known to the network access device 14, while the private key is stored in a private key database 38 (see FIGS. 1 and 2). The network access device 14 encrypts the user password using the public key (see block 52) and thereafter sends the network username and the encrypted network password to the NAS 24 which, in turn, forwards the network username and the encrypted network password to the network decryption server 16 (see block 54). In one embodiment, the dialer 34 tags or identifies the particular encryption key that it has used in the encryption process and, once identified, the network decryption server 16 uses the tag or identification as an index into the private key database 38 and retrieves the private key associated with the tag or identifier as shown in block 56. As described in more detail below, private/public key pairs may overlap so that the public key used by the dialer 34 may have a validity period that overlaps in time with at least one other private/public key pair. Likewise, as described in more detail below, encryption algorithms may have validity periods that overlap. Returning to FIG. 3, in block 58 the network decryption server 16 uses the identified private key to decrypt the encrypted network password and, for example, generate an original clear text password as input by the network user.

In order to complete the authentication process, in block 60 the network decryption server 16 forwards the network username and the network password to an authentication (AAA) server 40 for verification. In one embodiment, the AAA server 40 uses the network username as an index into the authentication database 42 to retrieve the official password that is associated with the network username. If the official password matches the password input by the network user and sent by the network access device 14, the AAA server 40 sends an appropriate acknowledgment signal to the NAS 24, and the NAS 24 forwards the signal to the network access device 14, acknowledging the successful verification and grants access to the Internet 30 or some other resource. The methodology performed in block 56 is described in more detail below.

Key Pair Updating

Figure 5:
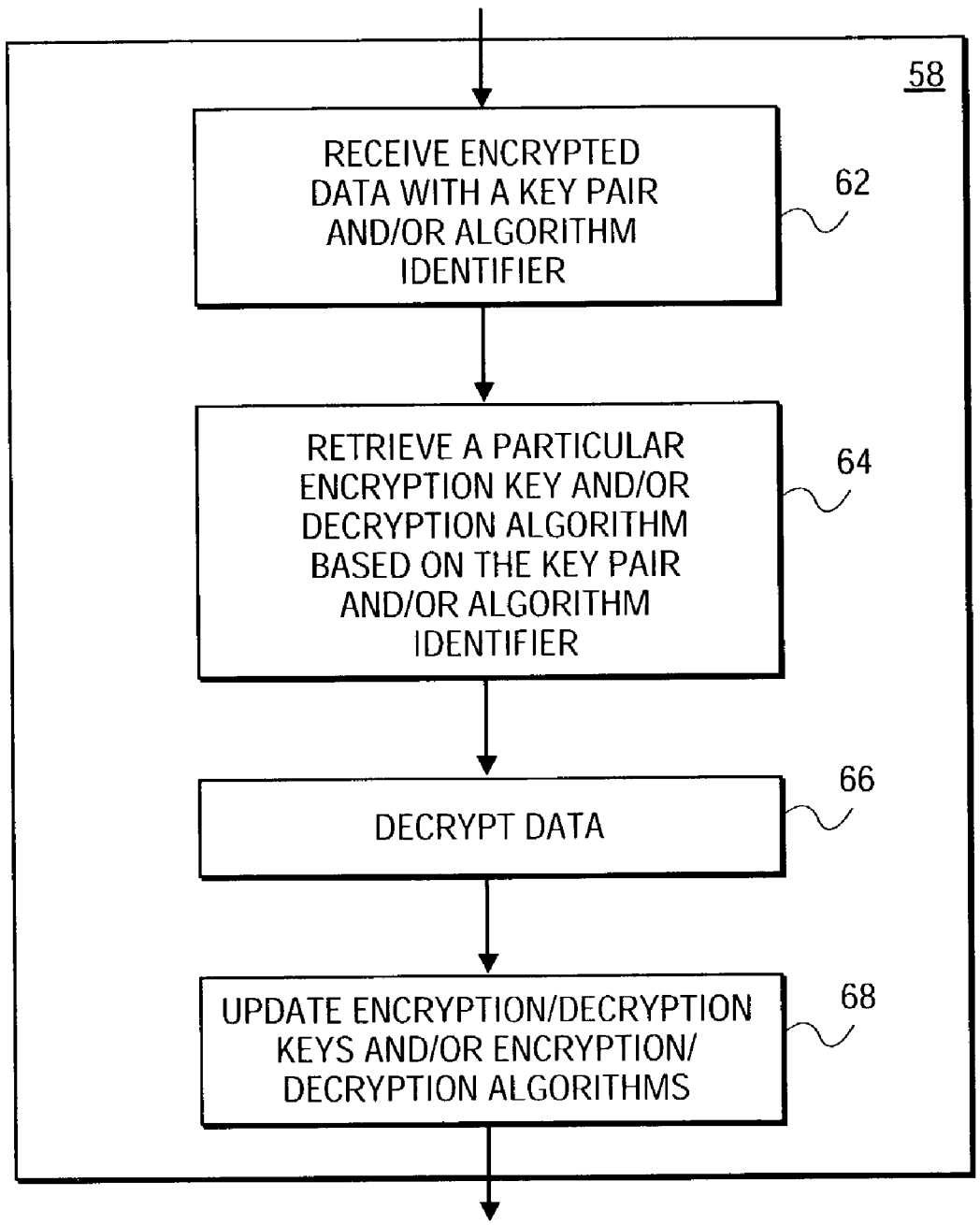
FIG. 5 is a schematic flow diagram of a method, in accordance with an aspect of the invention, for changing encryption information.

When the connect client application or dialer 34 is customized, the dialer customization tool tags the generated public/private key pair with a key index so that it may be identified. In one embodiment, the key index is a numeric field of one or more digits indicating the version number of generated key pair. The dialer customization tool includes the public key and its corresponding key index within the connect application or dialer 34. The customization tool also stores the private key and the corresponding key index in the private key database 38 (see FIGS. 1 and 2). When the dialer 34 encrypts the password with the public key, it transmits the encrypted password and the key index to the NAS 24 (see block 62 in FIG. 5) and the decryption server 16 during the authentication process. The decryption server 16 identifies and retrieves the private key associated with the key index (see block 64) and decrypts the password using the private key corresponding to the public key and key index (see block 66) and uses the decrypted password for authentication purposes.

Figure 4:
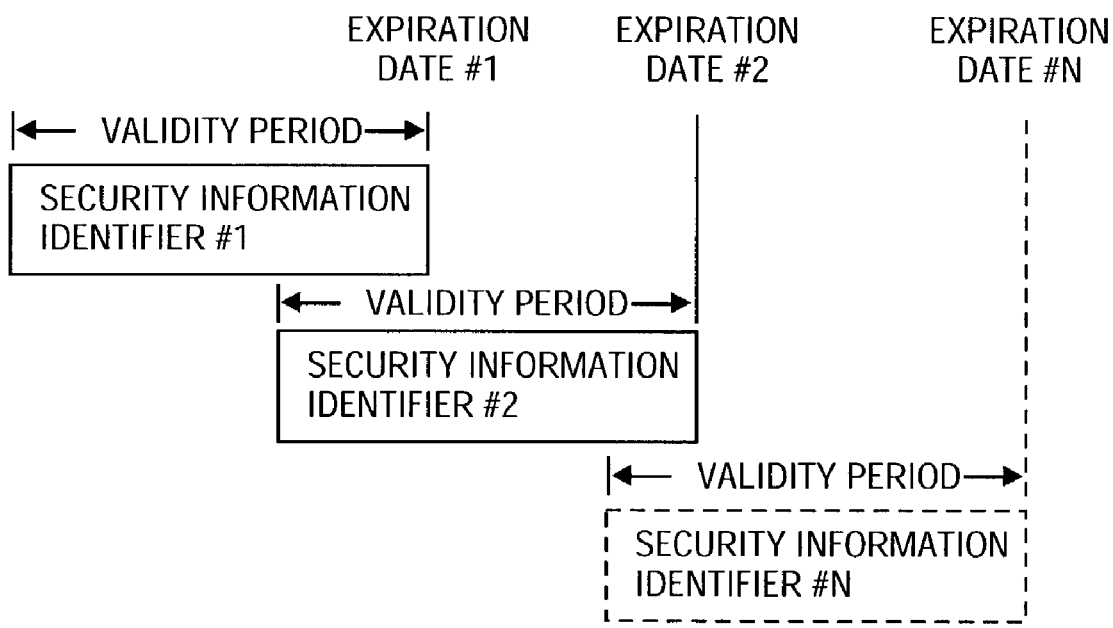
FIG. 4 is a schematic representation of overlapping security information, in accordance with an aspect of the invention.

In one embodiment, in order to migrate the public/private key pair, the dialer customization tool is used to generate a new key pair. The customization tool tags the generated public/private key pair with a new key index. The customization tool then includes the new public key and its corresponding new key index within the dialer 34 (e.g., as part of the config.ini file). In certain embodiments, the new version of the config.ini file is also placed in an Update Server (see below). The customization tool then stores the new private key and the corresponding new key index in the private key database 38. The customization tool updates the private key database 38 with an expiration date for the entry corresponding to the old (or first) private key/key index. Although the embodiment described has a first and a second private/public key pair, it is to be appreciated that a plurality of overlapping key pairs may be provided wherein each key pair has a different expiration date as illustrated in FIG. 4.

When connect application or dialer 34 containing the old public key/key index communicates with the network 10, 20, it encrypts the password with the old (or first) public key. The encrypted password and the corresponding old key index are then transmitted to the NAS 24 and decryption server 16 during the authentication process, as described above. The decryption server 16 utilizes the key index to determine the private key that the dialer 34 has used to encrypt the password and thus identify the old public key. In one embodiment, the decryption server 16 then verifies if the expiration date set for this first key pair entry in the private key database 38 has not yet lapsed and, if the validity period for the old key pair has not lapsed, the decryption server 16 uses the old the private key to decrypt the password. The decrypted password may then be used for authentication purposes, as described above. Thus, although a new (or second) encryption key has been generated, the old (or first) encryption key remains valid for a window period to enable a network user that has not yet been issued with a new encryption to sill access the network 10, 20.

If the network user is authenticated, after connecting, for example, to the Internet 30, the connect application or dialer 34 contacts the Update Server, which is identified in the config.ini file via a URL, to determine if an encryption key update is required and, if so, downloads the new public/private key with its associated key index. In certain embodiments, the dialer 34 contacts the Update Server and retrieves a version number of various files included with the dialer 34 after every successful connection to the Internet. In this embodiment, the dialer 34 would determine that the version number of the config.ini file (which contains the new key, and index) has changed and, if so, download the updated config.ini file. In one embodiment, the dialer 34 then replaces the old encryption key with the new public key identifiable by its associated key index or identifier to allow subsequent decryption by its corresponding private key. It is to be appreciated that the updating of the encryption process may, for example, take place at any point during the authentication process. For example the updating of the encryption key may take place after the password has been decrypted (see block 68 in FIG. 5). It is also to be appreciated that, in certain embodiments, other dialers 34 may also use the same private/public key pair and thus the validity overlap period may range from, for example, hours to even days depending on the circumstances. Ideally, during this overlap period, all dialers 34 using the old key pair communicate with the network 10, 20 so that they may be migrated to the new key pair. Once an expiration day for a particular key pair arrives, the key pair is no longer valid and the dialer 34 can no longer access the network 10, 20 with the old key pair (see FIG. 4). Thus, in certain embodiments, the method 50 allows an administrator to control the expiration date for the key pairs. In one embodiment, clients with the dialer 34 that did not connect to the network 10, 20 prior to the expiration of the old key pair will fail to authenticate and would thus fail to migrate to the new key pair.

Algorithm Updating

In a similar fashion to the updating or changing of an encryption key pair, the underlying encryption/decryption algorithm may be changed or migrated for various reasons. For example, there may be a weakness in the encryption/decryption process, an improved algorithm may have been developed, or the like. It is however to be appreciated that the method, in accordance with the invention, may be used in certain embodiments to change either one of or both of the encryption keys pair and the encryption algorithm.

In one embodiment, the dialer customization tool tags the generated public/private key pair with a key index as well as algorithm identifier. For example, the algorithm identifier may be one or more characters indicating the algorithm to be used for encryption/decryption, as shown in the tables that follow. The customization tool includes the public key, its corresponding key index and the algorithm identifier within the connect application or dialer 34. In one embodiment, the customization tool then stores the private key, its corresponding key index and the algorithm identifier in the private key database 38. In a similar fashion to that described above, when a dialer 34 containing the old algorithm communicates with the network 10, 20, the dialer 34 encrypts the password using the old algorithm. The encrypted password, the corresponding key index and the associated algorithm identifier are then transmitted to the server during the authentication process (see block 52 in FIG. 3). The decryption server 16 then utilizes the algorithm identifier to identify the corresponding algorithm to be used for decrypting the password. The password is then decrypted and authenticated as described above.

If the network user is authenticated, after connecting, for example, to the Internet 30, the connect application or dialer 34 contacts the Update Server to determine if an encryption algorithm update is required and, if so, downloads the encryption algorithm with its associated key identifier. The dialer 34 will use the new algorithm for subsequent connection attempts and, has therefore successfully migrated to the new algorithm. Thus, an administrator may control the algorithms used for the encryption/decryption and thus weed out older algorithms.

In a similar fashion to that described above, an encryption algorithm and/or encryption keys used to encrypt any other data may be changed in any network. It is thus to be appreciated that the password application used to illustrate the invention is merely by way of example. Likewise, the method 50 may also be used to change or migrate passwords or any other security information in a network.

The encryption and decryption of data using overlapping security information, e.g., the private/public key pair and/or encryption algorithm, may be independent of the authentication protocols used to send the credentials from the network access device 14 to the NAS 24 and ultimately to the AAA server 40. For example, the invention can be implemented to work with popular authentication protocols such as PAP, CHAP, EAP and RADIUS, among others.

For one embodiment of the invention, the NAS 24 is configured to use PAP and RADIUS for authenticating network user credentials. When configured for PAP/RADIUS, the NAS 24 negotiates the use of PAP with the network access device 14 when the communication session between the NAS 24 and the network access device 14 is initiated. The NAS 24 is configured as a RADIUS client of the AAA server 40, which is a RADIUS server. The network decryption server 16 is also configured as a RADIUS server, but acts as a RADIUS proxy client to the AAA server 40. In this configuration, the network access device 14 encrypts the password, as entered by the network user. Then, the network access device 14 creates a PAP packet and places the network username and encrypted network password into the proper fields within the packet. Next, the network access device 14 sends the PAP packet to the NAS 24. The NAS 24 forwards the data to the network decryption server 16 using a RADIUS packet. The network decryption server 16 decrypts the password and uses RADIUS to forward the clear text password to the AAA server 40 for verification.

In an alternative embodiment, the NAS 24 is configured to use CHAP and RADIUS to authenticate network user credentials. In a network configured to use CHAP/RADIUS, the NAS 24 negotiates with the network access device 14 to use CHAP as the authentication protocol, instead of PAP. Next, the NAS 24 generates a random number and sends it to the network access device 14. The dialer 34 executing on the network access device 14 uses the random number to generate a non-reversible hash of the password using a pre-determined encryption algorithm. Rather than encrypt the actual password, the network access device 14 encrypts the non-reversible hash of the network password in accordance with the exemplary embodiment of the invention as described above. The network access device 14 creates a CHAP packet and sends the network username and the encrypted non-reversible hash to the NAS 24.

The NAS 24 sends the data, including the network username, the encrypted non-reversible hash, and the original random number used to generate the non-reversible hash, to the network decryption server 16 using the RADIUS protocol. The network decryption server 16 decrypts the non-reversible hash and replaces the non-reversible hash in the RADIUS packet, which is forwarded to the AAA server 40.

The AAA server 40 receives the packet and retrieves the password associated with the network username from the authentication database 42. The AAA server 40 uses the random number originally generated at the NAS 24 to perform a hash operation on the original password retrieved from the authentication database 42. Next, the AAA server 40 compares the hash it generated to the hash it received from the network access device 14. If the two hashes match, the verification is successful and the AAA server 40 sends an appropriate acknowledgment signal to the network access device 14 granting access to the Internet 30 some other resource.

In another embodiment of the invention, the NAS 24 is configured to use EAP and RADIUS. EAP works in much the same way as CHAP, except the random number sent to the network access device 14 is generated by the AAA server 40 instead of the NAS 24. Because the invention works with any authentication protocol, the invention can easily be implemented to work with a variety of network configurations and provides a very strong, minimal level of security using LEGACY systems.

Exemplary Application in a Multi-Party Access Environment

Application of the invention in an exemplary multi-party service access environment is described below. For the purposes of the present specification, the term "service access transaction" includes any transaction between a service customer and a service provider for a user session. An example of such a service may be access to any communications network via any medium or protocol. For example, the communications networks may comprise packet-switched networks, circuit-switched networks, cable networks, satellite networks, terrestrial networks, wired networks, and/or wireless networks. The term "service access transaction", however, is not limited to a network access transaction, and encompasses a transaction pertaining to access to any one of a number of other services such as content, commerce and communication services.

For the purposes of the present specification, the term "customer" includes any entity involved in the purchase and/or consumption of service access, regardless of whether the service access is performed by the customer or not. For example, a "customer" may be an end-user consumer that actually utilizes the service access, or a corporate entity to which such an end-user belongs, an Internet service provider, an Internet carrier, a reseller, or a channel.

An example of an environment in which multiple passwords and encryption algorithms and keys are used is a multi-party roaming access and settlement system for service access (e.g., Internet access, content access, commerce access, or communications access) services. These systems enable a service provider (e.g., an ISP, a wireless service provider, a VPN service provider, a content distribution service provider, an e-commerce service provider or an application service provider) to offer relatively secure service access in a multi-party access environment using, for example, standard communication protocols (e.g., PPP, HTTP) and standard authentication protocols (e.g., RADIUS, PAP, EAP or the like).

Roaming Service Access

Figure 6:
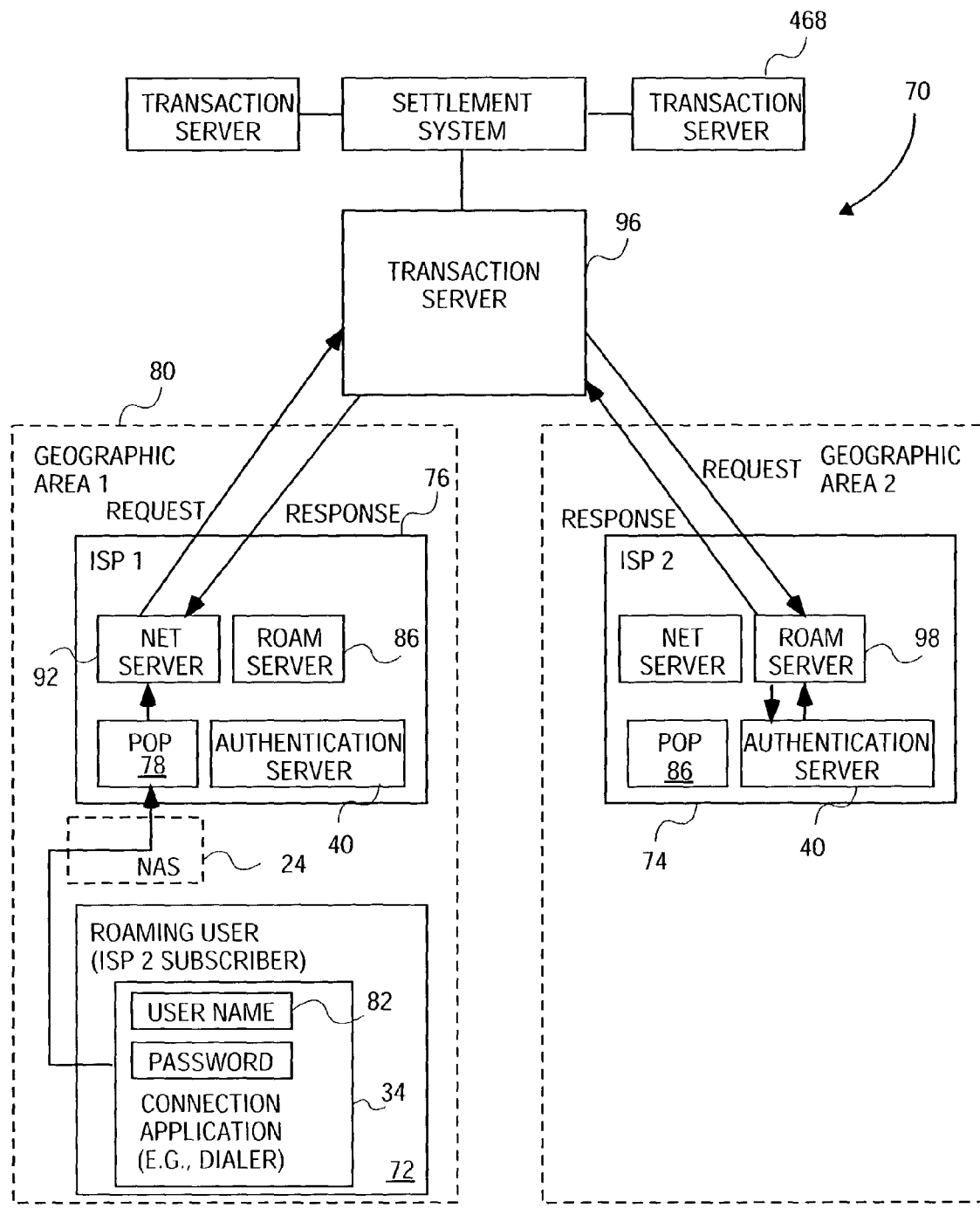
FIG. 6 is a schematic diagram of a roaming access system in which the method of FIG. 3 may be applied.

Referring in particular to FIG. 6, reference numeral 70 generally indicates an example of a roaming access system to provide roaming Internet access in a relatively secure manner. The exemplary method shown in FIG. 3 may be used to manage, distribute and migrate security information in the system 70. When a roaming user 72, shown to be a subscriber to a "home" ISP 74, connects to a remote ISP 76 that provides a local POP 78 within a specific geographic area 80, the roaming user 72 inputs the same user name 82 and password 84 (authentication data or user credentials) used when connecting via a POP 86 of the "home" ISP 74. However, standard or LEGACY multi-party access environments typically use PAP for dialup authentication and HTTP POST based authentication for wired and wireless broadband authentication. This results in the passwords being transported via insecure media and their confidentiality may be compromised and subsequently used to fraudulently access both networks of the roaming access system 70 and its customers. In order to alleviate this problem, in accordance with one embodiment of the invention, user data is encrypted by the connect dialer 34 prior to communicating it to the POP 78.

In one embodiment, the customers of the system 70 use a web form to download the connect dialer 34 to the network access device 14. This web form may include fields that can be used for specifying the required customizations. For example, the following fields are included in the web form for Secured Password Authentication in Plain-text (hereinafter referred to as "Extended Security Protocol")—

Enable Extended Security Protocol encryption: (Y/N)

Public Key: ****

Key Id: (0-9) (the key Id identifies the encryption key used by the dialer 34 as described above)

When a customer wants to enable Extended Security Protocol for their roaming users 72 (see FIG. 6), they use an ECC utility that is included in their associated RoamServer 86. The ECC utility can be used by customers to generate a public/private key pair and tag the pair with a key index or identifier. The private key is typically added to an esp_key_pair.txt file. The public key is typically sent to the dialer support team of the roaming access system 70 using an appropriate form. The dialer support team uses the dialer customization tool (DCT) to build the connect dialer 34 in accordance with one embodiment of the invention. The DCT tool includes a web page for specifying the encryption/decryption algorithm to be used and the ECC public/private keys, wherein both the encryption algorithm and key have identifiers.

The Transaction Server 96 maintains the dialer id, the last used value of the counter and the last access time in a table. This table is used for protecting the network against replay attacks. This table is typically replicated across all Transaction Servers 96. In certain embodiments, the Transaction Server 96 maintains a record of the customer's private key and key index and, accordingly, decryption of the authentication data takes place at the Transaction Server 96, which may thus define a decryption server. However, certain customers may wish to not provide their private key to any intermediaries such as the Transaction Servers 96. In these circumstances, the customer's private key is not provided to the Transaction Servers 96 but rather to the customer's RoamServer 98 that is typically at an in-house location. Accordingly, decryption of the authentication data may thus instead take place in a similar fashion to that described above at the customer's RoamServer 98.

When the Transaction Server 96 does not have access to the particular customer's private key, the Transaction Server 96 adds the necessary ECC attributes to the authentication request packet and sends it to the RoamServer 98. The RoamServer 98 decrypts the password and the checksum character using the ECC information and the private key with a corresponding key index or version number stored locally. The RoamServer 98 then performs tests to determine if the count is valid. The RoamServer 98 adds the decrypted count to the authentication reply packet so that the Transaction Server 96 can update its database with the latest value of the count.

Each Transaction Server 96 typically replicates a dialer_counter table and, in certain embodiments, a secure_pap table (see below) is provided that contains details about the public/private key pair, the key index and the algorithm used by the Extended Security Protocol.

TABLE

| FIELD NAME | DESCRIPTION |
|---|---|
| SECURE_PAP | |
| SPAP_ID | GENERATED ID THAT UNIQUELY IDENTIFIES THIS RECORD AND THUS THE ALGORITHM AND ENCRYPTION KEYS. |
| CUSTOMER_ID | CUSTOMER ID. |
| PUBLIC_KEY | PUBLIC KEY. |
| PRIVATE_KEY | PRIVATE KEY. |
| KEY_VERSION | KEY VERSION NUMBER/IDENTIFIER. |
| ALGORITHM | ALGORITHM IDENTIFIER. FOR EXAMPLE, E AND A. |
| EXPIRATION_DATE | TIME/DATE WHEN THIS RECORD WILL EXPIRE/VALIDITY PERIOD. |
| DESCRIPTION | DESCRIPTION ENTERED FROM DCT. |
| CREATION_DATE | TIME/DATE WHEN RECORD WAS CREATED. |

TABLE-continued

| FIELD NAME | DESCRIPTION |
|---|---|
| MODIFY_BY | USER WHO MODIFIED RECORD. |
| MODIFY_TIME | TIME WHEN RECORD WAS MODIFIED. CUSTOMER |
| ENCRYPT_FLAG | 0 = ENCRYPTION IS OPTIONAL, 1 = ENCRYPTION IS REQUIRED FOR THIS CUSTOMER DIALER_PROFILE |
| ENCRYPT_FLAG SPAP_ID | 0 = ENCRYPTION OFF, 1 = ENCRYPTION ON REFERENCES SECURE_PAP TABLE |

Exemplary Encryption/Decryption Functionality

In certain embodiments, the Transaction Server 96, and the RoamServer 98 include an ECC API that implements the FCC algorithms and provides an API for encrypting and decrypting passwords. Typically, the ECC implementation uses optimal normal basis mathematics for encryption/decryption. In certain embodiments, polynomial basis and optimal normal basis mathematics are combined to reduce the time for a mathematical inversion to the cost of a single multiply.

Encryption functionality of the dialer 34 may include encryption algorithms that generate a random point on an ECC curve. This random point may then be used for encoding the password and the checksum character to produce part of an ECC string <encoded password>. The dialer 34 encrypts the random point and transmits it to a NetServer 92. Typically, a symbol transformation scheme is used for this encryption as described below.

In order to accommodate existing protocols, e.g., PPP, PAP, RADIUS, or the like, the password fields have printable US-ASCII characters. In certain embodiments, the characters are generated in such a fashion so as to conform to RFC 2486 standards. In these embodiments, when the password and checksum fields are encrypted, care is taken to generate the string with acceptable characters so that they may be applied in networks using standard protocols. Accordingly, the following character transformation scheme may be used to perform this encoding. Each character to be encoded is first mapped into a value according to the table shown below.

| # | SYMBOL | # | SYMBOL | # | SYMBOL | # | SYMBOL |
|---|---|---|---|---|---|---|---|
| 0. | 0 | 1. | 1 | 2. | 2 | 3. | 3 |
| 4. | 4 | 5. | 5 | 6. | 6 | 7. | 7 |
| 8. | 8 | 9. | 9 | 10. | A | 11. | B |
| 12. | C | 13. | D | 14. | E | 15. | F |
| 16. | G | 17. | H | 18. | I | 19. | J |
| 20. | K | 21. | L | 22. | M | 23. | N |
| 24. | O | 25. | P | 26. | Q | 27. | R |
| 28. | S | 29. | T | 30. | U | 31. | V |
| 32. | W | 33. | X | 34. | Y | 35. | Z |
| 36. | A | 37. | B | 38. | C | 39. | D |
| 40. | E | 41. | F | 42. | G | 43. | H |
| 44. | I | 45. | J | 46. | K | 47. | L |
| 48. | M | 49. | N | 50. | O | 51. | P |
| 52. | Q | 53. | R | 54. | S | 55. | T |
| 56. | U | 57. | V | 58. | W | 59. | X |
| 60. | Y | 61. | Z | 62. | ~ (TILDE) | 63. | ` (GRAVE ACCENT) |
| 64. | ! (EXCLAMATION MARK) | 65. | # (NUMBER SIGN) | 66. | $ (DOLLAR SIGN) | 67. | % (PERCENT SIGN) |
| 68. | ^ (CARET) | 69. | & (AMPERSAND) | 70. | * (STAR SIGN) | 71. | ( (LEFT PARENTHESIS) |
| 72. | ) (RIGHT PARENTHESIS) | 73. | - (HYPHEN-MINUS) | 74. | _ (UNDERSCORE) | 75. | + (PLUS SIGN) |
| 76. | = (EQUALS SIGN) | 77. | { (LEFT CURLY BRACKET) | 78. | [ (LEFT SQUARE BRACKET) | 79. | } (RIGHT CURLY BRACKET) |
| 80. | ] (RIGHT SQUARE BRACKET) | 81. | \| (VERTICAL LINE) | 82. | \ (REVERSE SOLIDUS) | 83. | : (COLON) |
| 84. | ; (SEMICOLON) | 85. | ' (QUOTATION MARK) | 86. | ' (APOSTROPHE) | 87. | < (LESS-THAN SIGN) |
| 88. | , (COMMA) | 89. | > (GREATER-THAN SIGN) | 90. | ? (QUESTION MARK) | 91. | (SPACE) |
| 92. | / (SOLIDUS) | 93. | . (FULL STOP) | 94. | @ (COMMERCIAL AT) | | |

The mapped value is then added to the corresponding byte in the random point and the modulus 95 is calculated. This results in the character being mapped to another character in the above table. To decode the character at a decryption server, the corresponding byte in the random point is subtracted from the encoded character and the modulus 95 of the result is calculated. If the result is a negative number, then the value 95 is added to the result to obtain the original character. By way of illustration, assuming "r" is the byte in the random point used for the encoding, and "x" is the original character, then, Encode: y=(x+r)%95
Decode: x=(y−r)%95
If (x<0) then
    x=x+95;

The password field and the checksum character are encrypted with the random point during the encryption process at the dialer 34. Each one of these fields uses a different set of bytes in the random point for encoding. The password field uses the first set of bytes for it's encoding, and the checksum field uses byte 10 for it's encoding.

The checksum character is used for ascertaining the integrity of the dialer id and counter values. If the dialer id and the counter value are transmitted in the clear, a malicious person can alter these values and thereby defeat the protection against replay attacks. To address this problem, a checksum character is generated from the dialer id and counter value where after it is encoded using the random point. The encrypted checksum character is then transmitted as part of the user id string.

The checksum character is generated by the MD5 hash of the count value, the dialer id and the random point. Seven bits are then selected from the hash and then encoded with a single byte (byte #10) from the random point using the encoding methodology described above. The encoded bits are then dispersed among the last seven bytes of the encrypted point and transmitted as part of the user string. When the dialer 34 sends the encoded data to the Transaction Server 96 or RoamServer 98, as the case may be, they validate the dialer id and counter value by independently generating the checksum and compare it with the checksum sent by the dialer 34 and reject if they don't match.

Returning to the dialer 34, the encoded strings are then concatenated as follows to create an ECC string:

<encoded password><encrypted and encoded x coordinate of the random point with encoded checksum bits in the last seven bytes>

Thereafter, the dialer 34 concatenates the ECC string with the dialer id and the counter value and transmits it in the userid and password fields of the protocol, e.g. PAP. For example, <encoded password><encrypted and encoded x coordinate of the random point with encoded checksum bits in the last seven bytes><dialer id><counter value>.

It will be noted that the methodology set out above produces an encrypted string that is of such a string length, and includes characters of such a nature, that the encrypted string may be communicated using LEGACY systems.

The encryption logic is typically encapsulated in an ip_spap_encrypt( ) method with the following signature:

char *ip_spap_encrypt(const char *algorithm, const char
        public_key, const char password, const char *dialer_id,
        const char *counter, char **plain_point, char
        **encrypted_point, int *returnCode);
    where
    algorithm is the algorithm to be used which is identifiable by an algorithm identifier.

public_key is the ECC public key (from config.ini) and which is identifiable by a key identifier or index.

password is the plain-text password.

dialer_id is the id of the dialer (obtained from the dialer id servlet).

counter is the count of dial attempts (incremented by the dialer for each dial attempt).

plain_point—If this field is left empty, a new random point is generated. This field points to the random point used for the encoding on return.

encrypted_point—If this field is left empty, the plain point and the public key is used to generate the encrypted point. This field points to the encrypted point used by the method on return.

returnCode 0 if the call is successful, a non-zero code is provided. The method returns the ECC string is returned when successful and a null otherwise.

The decryption logic is encapsulated in the ip_spap_decrypt( ) method. The method have the following signature:

char *ip_spap_decrypt(const char *algorithm, const char
        private_key, const char ecc_string, const char *dialer_id,
        const char *counter, int *returnCode); where
    algorithm is the algorithm to be used and may thus be in the form of an algorithm identifier.

private_key is the ECC private key (from securepap table which includes the algorithm identifier and key index or esp_key_pair.txt file)

ecc_string is the string returned by the encrypt( ) method dialer_id is the id of the dialer (obtained from the dialer id servlet)

counter is the count of dial attempts (incremented by the dialer for each dial attempt)

returnCode 0 if the call was successful; non-zero code otherwise

The method returns the plain text password when successful and a null otherwise.

Dialer Customization Form

As mentioned above, the customers use a web form for requesting a customized dialer to configure the dialer. This web form typically contains fields that can be used for specifying the required customizations. The web form may include the following exemplary fields:

Enable Extended Security Protocol encryption: (Y/N)
Public Key: ****
Key Id: (0-9) which identifies the particular key version used by the dialer 34 to perform encryption.

Dialer Customization Tool

During the customization process, an administrator of the roaming access system 70 has the option of generating a dialer 34 that may, for example, use Extended Security Protocol. If enabled, the following exemplary fields may be set in a config.ini that is typically packaged with the dialer 34:

[processing facility identification e.g., iPass]
EncryptFlag=yes
Algorithm=algorithm identifier used in updating
KeyVersion=0 (key index or identifier used in updating)
PublicKey=BwAAAMGdqYx2lxhWtEQMdDHhvwU=&
    AQAAAFdd4 0uLQMD1UTtyBqDHY=

These values are also stored in the Transaction Server database so that the Transaction Server 96 can decrypt the password sent from the corresponding dialer 34 of a particular customer. In the present embodiment, only the public key is stored in this file, as the private key is kept secret for the encryption to be secure.

In addition to enabling Extended Security Protocol, the customization tool also provides the option of setting the algorithm used and the key version. For example, the following encryption algorithms may be supported:

A for no encryption.

E for Extended Secure Protocol (ESP)

S for ESP compatible with Unique Session ID

U for Unique Session ID

It is however to be appreciated that, in other embodiments, the algorithm and encryption keys may be identified using any other identifier, e.g. alphanumeric characters or the like.

In on embodiment, A is primarily for testing and debugging purposes. E is used for encrypting the password when the dialer does not have the dialer id. U may not be an encryption algorithm, but is used to identify the unique session id, as discussed in more detail below.

As mentioned above, the validity of security information may overlap in time and thus two, or more, keys may be active or valid during the overlap period. The key version starts at zero, but is incremented every time a new key-pair is desired for an existing dialer profile. The dialer 34 stores the keys and other information in the secure_pap table (see above). This table is then replicated to the Transaction Server 96 via Oracle snapshots. As mentioned above, a new key-pair is typically generated if the private key has been compromised.

When the security of the private key is compromised, the following actions are performed on the network 10, 20.

An appropriate expiry date for the compromised key is set (see SECURE_PAP TABLE above). The date of expiry is typically chosen so as to ensure all dialers 34 using the compromised key can still use the key at least one more time. Thus, when the dialers 34 connect to the network 10, 20 using the old or compromised key, the config.ini file is retrieved with the new key from the Update Server. If the customer is using the RoamServer 98 to decrypt the password, the customer may manually remove the compromised key from the esp_key_pair.txt file after the expiry date.

A new or updated key pair is generated by the network 10, 20 as described above or, in other embodiments, the customer may generate a new key pair and send the public key to the roaming access system 70.

The DCT tool then replaces the compromised public key (in which new key id is used to identify the updated key).

A new dialer 34 is then built using the updated key.

Dialer

In one embodiment, the dialer 34 checks the config.ini file to determine whether or not it should be encrypting passwords. If Extended Security Protocol is enabled, then the dialer 34 encrypts the password using the public key from the config.ini file and by invoking the ip_spap_encrypt( ) method. The method creates an ECC string and returns it. In one embodiment, the dialer 34 concatenates the ECC string with the dialer id and the counter value. The first sixteen characters of the ECC string may be placed in the password field and the rest of the string may be placed in the prefix field (with 0S or 0E prefix). The dialer 34 may use algorithm "E" until it obtains a dialer id. The prefix may be included after all system and routing prefixes, but before the customer prefixes. In one embodiment, the dialer 34 does not encrypt the password and does not create the Extended Security Protocol prefix if the POP being dialed has a prefix that is not compatible with and PAP prefix in the phonebook. A sample username, which includes the encryption prefix is a follows:

UserID: IPASS/0S Axrt50zTxca546hjdgkbxcjc^_d0we/joe@ipass.com
Password: x35~!4Qu{xy71]D8
where KeyVersion=0 and Algorithm=S.

If the roaming access system 70 determines that no encryption is needed, it creates a unique session id from the dialer count and places it in the prefix field. A sample username, which includes the unique session id prefix is as follows:

UserID: IPASS/0UAxrt5AB2/joe@ipass.com
Password: thisisabigsecret
where KeyVersion=0 and Algorithm=U.

The dialer 34 stores the plain_point and the encrypted point in its local storage.

When a redial is attempted, the dialer 34 increments the counter and invokes the ip_spsp_encrp( ) method using the plain point, and encrypted point.

Encryption Update

When the encryption information requires updating, a new key pair identified by the Key Version is provided. Thus when the dialer 34 checks the config.ini file it will then obtain the updated encryption key. Likewise, when the encryption algorithm is updated, the Algorithm identifier will identify that an updated algorithm is available.

Transaction Server

On startup, the roaming access system 70 reads all private keys from the database into a local cache for efficient lookup. It also has an additional attribute in the customer cache to indicate if a certain customer requires password encryption or not. The Transaction Server 96 also caches the dialer_counter table. Any changes to records in these tables at runtime may take immediate effect. This is accomplished using the same mechanism used in other components of the roaming access system 70 using database triggers and the cache_update table.

If the encrypted prefix field specifies the 'S' algorithm, the Transaction Server 96 may concatenate the contents of the password field to the encrypted prefix field constructed by the customer resolution process and creates the "ECC field". The ECC field contains:

<encoded password><encrypted and encoded x coordinate of the random point><encoded checksum character>

The Transaction Server 96 locates the private key for the appropriate customer using the key index. If the private key is found in the database, it calls the ip_spap_decrypt( ) method to decrypt and decode the password. The password field is then overwritten with the plain-text password before it is sent to the RoamServer 98.

If the private key is not located in the cache, the Transaction Server 96 typically adds the following fields to the authentication request packet and sends it to the RoamServer 98: algorithm, key index, the ECC field (as password), dialer id, counter, value and access time of the counter last used (from the database), and the "decrypt_at_roamServer" flag set to "yes".

The Transaction Server 96 then stores the authentication details in the ip_auth_trans table and the dialer_counter details in the dialer_counter_ts table. The Transaction Server 96 typically inserts a new dialer_counter_ts record every time as inserts are usually faster than updates.

When the Transaction Server 96 receives the account request, it uses the customer resolution process to create the unique session id and adds it to the packet as "ipass_session_id".

ESP Tool

The ESP command line tools are used by the customers in conjunction with their RoamServers 98, the DCT team, and the QA team to generate public/private key pairs and test the encryption and decryption algorithms.

esp_genkey (for customers with RoamServers 98):

This tool prints the public/private ESP key pair to a file named esp_key_pair.txt. This file resides in the/usr/ipass/keys directory on Unix, and in the IPASS_HOME/keys directory for Windows. The keys must also be submitted to the roaming access system 70 via, for example, a secure website so that the dialer 34 can be built with the public key. Typically, a secure backup of the private key is also maintained.
Roamserver The RoamServer 98 typically checks for the presence of the "decrypt_at_roamserver" field in the packet received from the Transaction Server 96. If the field is present, the RoamServer uses the "key index" field from the packet and fetches the private key from the esp_key_pair.txt file. The ECC string along with the private key, dialer id and counter value is passed to ip_spap_decrypt( ) method. The ip_spap_decrypt( ) method decodes and decrypts the password. In one embodiment, the plain text password is then used by the RoamServer 98 to authenticate the user.

Once the dialer 34 has performed the methodology set out above, the authentication data is communicated to the NAS 24 whereafter it is sent to an authentication server 40 of the remote ISP 76. In the normal course of operations, the NAS 24 at the remote ISP 76 would reject the supplied authentication information. However, as illustrated in FIG. 4, the NetServer 92 intercepts the authentication information to facilitate recognition of this authentication information as a roaming user authentication request and not a regular user request.

The authentication server 40, in conjunction with the NetServer 92, parses the received authentication information to determine a roaming domain name or routing prefix associated with the roaming user 72. Should such a domain name or prefix be present, the user's authentication information is encrypted as set out above, and sent from the NetServer 92 to the Transaction Server 96 via a secure socket layer (SSL).

The Transaction Server 96 may use a customer routing prefix in the session identification to route the request. Instead, the Transaction Server 96 may perform an Internet Protocol (IP) look-up and routes the authentication request to an appropriate home ISP 74. More specifically, the Transaction Server 96 receives the encrypted authentication request from the NetServer 92 at the remote ISP 72, and decrypts this request as described above. The Transaction Server 96 then determines the "home" ISP 74 by matching the roaming domain name or routing prefix of the desired home ISP 74 against a current list of participant domain names and IP addresses. If the match is successful, the authentication request is encrypted and sent via SSL to the RoamServer 98 that resides at the home ISP 74. In the event that the identified RoamServer 98 does not respond within a specific period, the Transaction Server 96 will attempt to contact an alternative RoamServer 98 at the ISP of the relevant domain.

The RoamServer 98 at the home ISP 74 then decrypts the authentication request sent from the Transaction Server 96, as described above, and submits the authentication request to the home ISP's regular authentication server 40 as if it were a terminal server or NAS 24 owned by the home ISP 74. The authentication server 40 of the home ISP 74 responds to the request by providing an "access permitted" or an "access denied" response based on the validity of the user name and password included within the authentication request. The response from the home ISP's authentication server 40 is received by the RoamServer 98, encrypted, and sent back to the Transaction Server 96.

Figure 7:
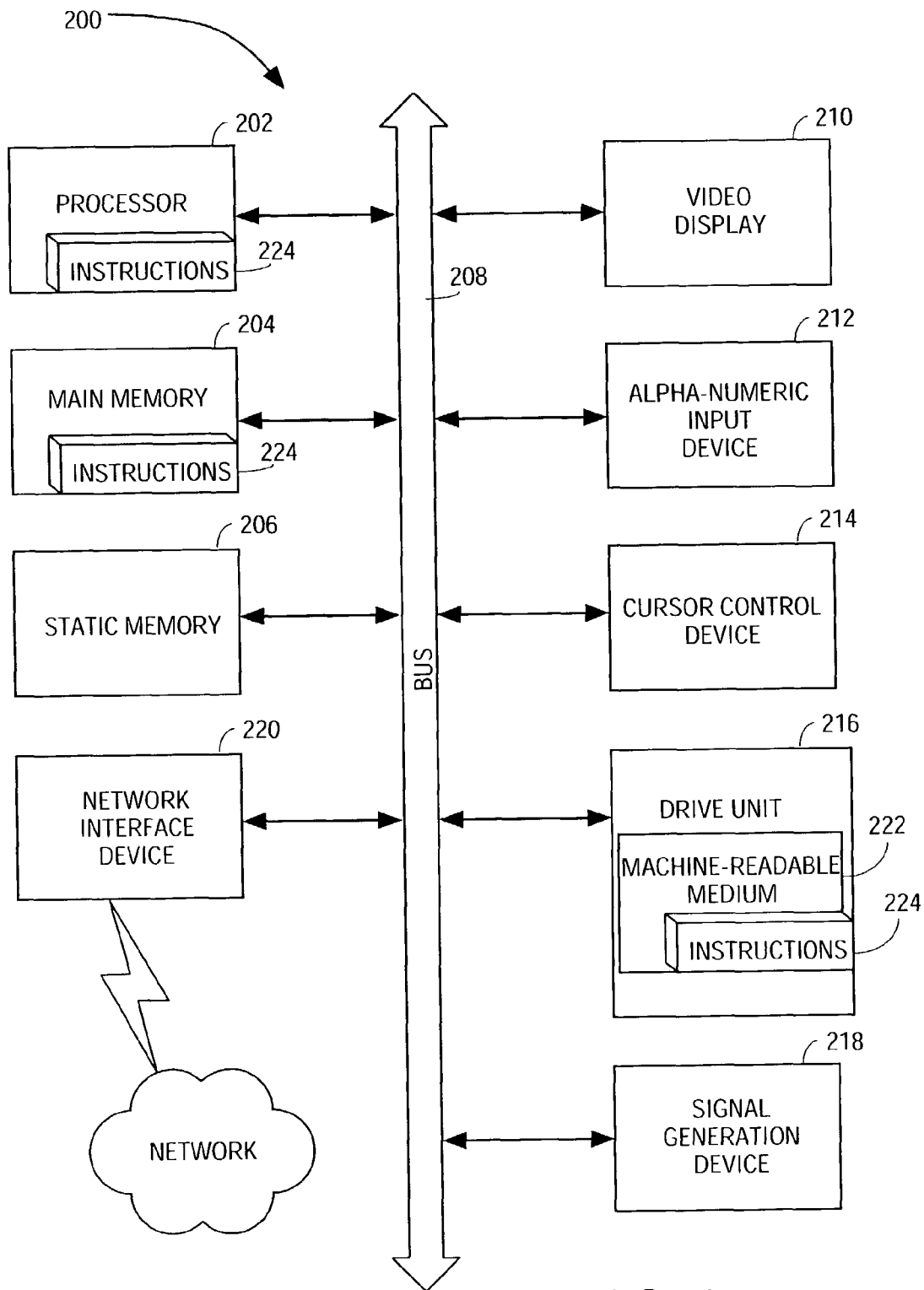
FIG. 7 is a schematic diagram of a computer system, which may be configured as a network access device or a network decryption server.

FIG. 7 shows a diagrammatic representation of machine in the exemplary form of a computer system 200 within which a set of instructions, for causing the machine to perform any one of the methodologies discussed above, may be executed.

The computer system 200 may be used to define the network access device 14 or any of the servers of the system 70. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g. a keyboard), a cursor control device 214 (e.g. a mouse), a disk drive unit 216, a signal generation device 218 (e.g. a speaker) and a network interface device 220.

The disk drive unit 216 includes a machine-readable medium 222 on which is stored a set of instructions (i.e., software) 224 embodying any one, or all, of the methodologies described above. The software 224 is also shown to reside, completely or at least partially, within the main memory 204 and/or within the processor 202. The software 224 may further be transmitted or received via the network interface device 220. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. It is to be appreciated that the instructions may reside on a single machine or be distributed over more than one machine.

Thus, a method of, and system for, changing security information is described. In the foregoing detailed description, the invention has been described with reference to specific exemplary embodiments thereof. It will, however, be evident that various modifications and changes may be made thereto without departing from the broader scope and spirit of the invention as set forth in the appended claims. The specification and drawings are, accordingly, to be regarded in an illustrative sense rather than a restrictive sense.

What is claimed is:

1. A method of changing encryption information in a computer network, the method comprising:

generating at least first cryptographic key information and second cryptographic key information configured for being utilized for network access, the first cryptographic key information including a first encryption key and a first identifier and the second cryptographic key information including a second encryption key and a second identifier, wherein the first and second identifiers identify the first and second cryptographic keys respectively;

determining a first validity period for the first cryptographic key information, a second validity period for the second cryptographic key information, an expiry date for the first validity period, and an expiry date for the second validity period, wherein the expiry date of the first validity period precedes the expiry date of the second validity period so that the first and second validity periods overlap in time;

receiving, from a user device, encrypted data and one of the first and second identifiers;

identifying which one of the first and the second encryption keys has been used to encrypt the data, wherein the identifying is based on which of the first and second identifiers was received along with the encrypted; and updating the first encryption key on the user device via the computer network with the second encryption key after the user device accesses the computer network using the first encryption key during an overlap period of the first and the second validity periods.

2. The method of claim 1, wherein the first cryptographic key information includes a first private/public key pair and the second cryptographic key information includes a second private/public key pair.

3. A method for processing encrypted network access credentials in a computer network, the method including:

receiving an encrypted network access credential and one of a first identifier and a second identifier from a user device, the encrypted network access credential being encrypted using one of first and second encryption algorithms, the first encryption algorithm being valid for a first validity period and the second encryption algorithm being valid for a second validity period, the first encryption algorithm associated with the first identifier and the second encryption algorithm associated with the second identifier thereby to identify the first and second encryption algorithms respectively;

identifying which one of the first and the second encryption algorithms has been used to encrypt the encrypted network access credential, wherein the identifying includes using the one of the first identifier and the second identifier as an index for finding the one of the first and the second encryption algorithms in a database storing the first and second encryption algorithms;

determining, based on the first and second validity periods, that the one of the first and second encryption algorithms is valid;

decrypting the encrypted network access credential using the one of the first and second encryption algorithms to form a decrypted network access credential;

granting access to the network based on the decrypted network access credential; and updating the first encryption algorithm on the user device via the computer network with the second encryption algorithm after the user device accesses the computer network using the first encryption algorithm during an overlap period of the first and the second validity periods.

4. The method of claim 3, wherein the first and second validity periods overlap and the first validity period is prior in time relative to the second validity period.

5. The method of claim 3, wherein the first identifier is associated with a first private/public key pair and the second identifier is associated with a second private/public key pair.

6. The method of claim 3, wherein the encrypted network access credential is user authentication data for authenticating use of the computer network by the user device, the first and the second encryption algorithms being provided on the user device, the method including:

identifying when the first encryption algorithm has been used to encrypt the network access credential; and decrypting the encrypted network access credential with a decryption algorithm associated with the first encryption algorithm.

7. A method of changing security information in a computer network, the method comprising:

generating at least first security information and second security information configured for being utilized for network access, the first security information including first encryption key and a first identifier and the second security information including second encryption key and a second identifier thereby to identify the first and second security keys respectively;

presenting a first validity period for the first security information, a second validity period for the second security information, an expiry date for the first validity period, and an expiry date for the second validity period, wherein the expiry date of the first validity period precedes the expiry date of the second validity period so that the first and second validity periods overlap in time;

receiving encrypted data and one of the first and second identifiers, wherein the encrypted data was encrypted using one of the first encryption key and the second encryption key;

identifying, based on which one of the first and second identifiers was received, which one of the first and the second encryption keys has been used to encrypt encrypted data thereby to identify an associated decryption algorithm; and updating the first encryption key on the user device via the computer network with the second encryption key when the user device accesses the computer network using the first encryption information during an overlap period of the first and the second validity periods.

8. The method of claim 7 which includes providing the first cryptographic key in the form of a first private/public key pair and the second cryptographic key in the form of a second private/public key pair.

9. The method of claim 7, which includes providing the first cryptographic key is associated with a first cryptographic algorithm and the second cryptographic key in association with a second cryptographic algorithm.

10. The method of claim 7, which includes providing the first and the second security information in the form of first and second user passwords.

11. The method of claim 10, which includes providing a plurality of passwords with validity periods that overlap.

12. The method of claim 11, which includes providing each validity period with a different expiry date so that the validity periods overlap in time.

13. A method of processing data in a computer network, the method comprising:

receiving data from a user device, the data being secured using one of a first and second encryption algorithms, and the data including an identifier indicating the one of the first and second encryption algorithms used in securing the data;

identifying, based on the identifier, which one of the first and the second encryption algorithms secures the data;

determining the identified encryption algorithm that secures the data is within a validity period associated with the identified encryption algorithm;

processing the data with a decryption algorithm after the determining the identified security information is within the validity period; and updating the first encryption algorithm on the user device via the computer network with the second encryption algorithm after the user device accesses the computer network using the first encryption algorithm during an overlap period of the first and the second validity periods.

14. The method of claim 13, wherein the encryption algorithm is associated with one of a password, and an encryption key.

15. A machine-readable medium embodying a sequence of instructions that, when executed by the machine, cause the machine to:

generate at least first cryptographic information and second cryptographic information configured to be utilized for network access, the first cryptographic information including first encryption key and a first identifier and the second cryptographic information including second encryption key and a second identifier thereby to identify the first and second cryptographic keys respectively;

present a first validity period for the first cryptographic information, a second validity period for the second cryptographic information, an expiry date for the first validity period, and an expiry date for the second validity period, wherein the expiry date of the first validity period precedes the expiry date of the second validity period so that the first and second validity periods overlap in time;

identify, based on the first and second identifiers, which one of the first and the second encryption keys has been used to encrypt encrypted data thereby to identify associated decryption information; and update the first encryption key on the user device via the computer network with the second encryption key when the user device accesses the computer network using the first encryption key during an overlap period of the first and the second validity periods.

16. The machine-readable medium of claim 15, wherein the first encryption key is part of a first private/public key pair and the second encryption key is part of a second private/public key pair.

17. The machine-readable medium of claim 15, wherein the first encryption key is associated with a first cryptographic algorithm and the second encryption key is associated with a second cryptographic algorithm.

18. The machine-readable medium of claim 15, wherein the first and the second cryptographic information includes first encryption information provided on a user device, and the first encryption information being updated on the user device via the computer network with second encryption information when the user device accesses the computer network using the first encryption information.

19. A machine-readable medium embodying a sequence of instructions that, when executed by the machine, cause the machine to:

receive an encrypted network access credential and one of a first identifier and a second identifier from a user device, the encrypted network access credential being encrypted using one of first and second encryption algorithm, the first encryption algorithm being valid for a first validity period and the second encryption algorithm being valid for a second validity period, the first encryption algorithm being associated with the first identifier and the second encryption algorithm being associated with the second identifier thereby to identify the first and second encryption algorithms respectively;

identify which one of the first and the second encryption algorithms has been used to encrypt the encrypted network access credential, wherein the identifying includes using the one of the first identifier and the second identifier as an index for finding the one of the first and the second encryption algorithms in a database storing the first and second encryption algorithms;

determine, based on the first and second validity periods, that the one of the first and second encryption algorithms is valid;

decrypt the encrypted network access credential using the one of the first and second encryption algorithms to form a decrypted network access credential;

grant access to the network based on the decrypted network access credential; and update the first encryption algorithm on the user device via the computer network with the second encryption algorithm after the user device accesses the computer network using the first encryption algorithm during an overlap period of the first and the second validity periods.

20. The machine-readable medium of claim 19, wherein the first identifier is associated with a first private/public key pair and the second identifier is associated with a second private/public key pair.

21. The machine-readable medium of claim 19, wherein the encrypted network access credential is user authentication data for authenticating use of the computer network by the user device, the first and the second encryption algorithms being provided on the user device, and the machine-readable medium further including a sequence of instructions that, when executed by the machine cause the machine to:

identify when the first encryption algorithm has been used to encrypt the network access credential; and decrypt the encrypted network access credential with decryption information associated with the first encryption algorithm.

22. A machine-readable medium embodying a sequence of instructions that, when executed by the machine cause the machine to:

generate at least first security information and second security information configured to be utilized for network access, the first security information including a first encryption key and a first identifier and the second security information including a second encryption key and a second identifier thereby to identify the first and second security keys respectively;

present a first validity period for the first encryption key, a second validity period for the second encryption key, an expiry date for the first validity period, and an expiry date for the second validity period, wherein the expiry date of the first validity period precedes the expiry date of the second validity period so that the first and second validity periods overlap in time;

receiving encrypted data and one of the first and second identifiers, wherein the encrypted data was encrypted using one of the first encryption key and the second encryption key;

identify, based on which one of the first and second identifiers was received, which one of the first and the second encryption keys has been used to encrypt encrypted data thereby to identify associated decryption key; and updating the first encryption key on the user device via the computer network with the second encryption key when the user device accesses the computer network using the first encryption key during an overlap period of the first and the second validity periods.

23. The machine-readable medium of claim 22, wherein the first encryption key is associated with a first private/public key pair and the second encryption key is associated with a second private/public key pair.

24. The machine-readable medium of claim 22, wherein the first encryption key is associated with a first cryptographic algorithm and the second encryption key is associated a second cryptographic algorithm.

25. The machine-readable medium of claim 22, wherein the first and second security information include first and second user passwords.

26. The machine-readable medium of claim 25, wherein a plurality of passwords is provided with validity periods that overlap.

27. The machine-readable medium of claim 26, wherein each validity period is provided with a different expiry date so that the validity periods overlap in time.

28. A machine-readable medium embodying a sequence of instructions that, when executed by the machine cause the machine to:
receive data from a user device, the data being secured using one of first and second security algorithms, and the data including an identifier indicating the one of the first and second security algorithms used in securing the data;
identify, based on the identifier, which one of the first and the second security algorithms secures the data;
determine if the identified security algorithms that secures the data is within a validity period associated with the security algorithm;
process the data with the identified security algorithm after the determining the identified security algorithm is within the validity period; and updating the first encryption on the user device via the computer network with the second encryption algorithm when the user device accesses the computer network using the first encryption algorithm during an overlap period of the first and the second validity periods.

29. The machine-readable medium of claim 28, wherein the security algorithm is associated with at least one of a password, an encryption algorithm, and an encryption key.

30. A computer system comprising:
an encryption module configured to
generate at least first cryptographic information and second cryptographic information configured to be utilized for network access, the first cryptographic information including first encryption key and a first identifier and the second cryptographic information including second encryption key and a second identifier thereby to identify the first and second cryptographic information respectively;
receive encrypted data and one of the first or second identifiers, wherein the encrypted data was encrypted using one of the first encryption key and the second encryption key;
a customization tool to present a first validity period for the first cryptographic information, a second validity period for the second cryptographic information, an expiry date for the first validity period, and an expiry date for the second validity period, wherein the expiry date of the first validity period precedes the expiry date of the second validity period so that the first and second validity periods overlap in time;
an identification module to identify, based on which one of the first and second identifiers has been received, which one of the first and the second encryption keys has been used to encrypt encrypted data thereby to identify associated decryption information; and
an update module to update the first encryption information on the user device via the computer network with the second encryption information when the user device accesses the computer network using the first encryption information during an overlap period of the first and the second validity periods.

31. The system of claim 30, wherein the first validity period is provided with an expiry date that precedes an expiry date of the second validity period so that the first and second validity periods overlap in time.

32. A computer system comprising:
a network server to receive encrypted network access credentials and one of a first identifier and a second identifier from a user device, the encrypted network access credential being encrypted using one of first and second encryption algorithm, the first encryption algorithm being valid for a first validity period and the second encryption algorithm being valid for a second validity period, the first encryption algorithm associated with the first identifier and the second encryption algorithm associated with the second identifier thereby to identify the first and second encryption algorithms respectively;
a network connection module to identify which one of the first and the second encryption algorithms has been used to encrypt the encrypted network access credential, wherein the identifying includes using the one of the first identifier and the second identifier as an index for finding the one of the first and the second encryption algorithms in a database storing the first and second encryption algorithms;
a validity determination module to determine, based on the first and second validity periods, that the one of the first and second encryption algorithms is valid;
a decryption module to decrypt the encrypted network access credential using the one of the first and second encryption algorithm to form a decrypted network access credential;
an access granting module to grant access to the network based on the decrypted network access credential; and
an update module to update the first encryption algorithm on the user device via the computer network with the second encryption algorithm after the user device accesses the computer network using the first encryption algorithm during an overlap period of the first and the second validity periods.

33. A computer system comprising:
means for receiving an encrypted network access credential and one of a first identifier and a second identifier from a user device, the encrypted network access credential being encrypted using one of a first and second encryption algorithms, the first encryption algorithm being valid for a first validity period and the second encryption algorithm being valid for a second validity period, the first encryption algorithm associated with the first identifier and the second encryption algorithm associated with the second identifier thereby to identify the first and second encryption algorithm respectively;
means for identifying which one of the first and the second encryption algorithms has been used to encrypt the encrypted network access credential, wherein the identifying includes using the one of the first identifier and the second identifier as an index for finding the one of the first and the second encryption algorithms in a database storing the first and second encryption algorithm;
means for determining, based on the first and second validity periods, that the one of the first and second encryption algorithms is valid;
means for decrypting the encrypted network access credential using the one of the first and second encryption algorithms to form a decrypted network access credential;
means for granting access to the network based on the decrypted network access credential; and
means for updating the first encryption algorithm on the user device via the computer network with the second encryption algorithm when after the user device accesses the computer network using the first encryption algorithm during an overlap period of the first and the second validity periods.

* * * * *